United States Patent
Wu et al.

(10) Patent No.: US 7,383,585 B2
(45) Date of Patent: Jun. 3, 2008

(54) OPTICAL DISCS WITH CONTROLLABLE ACCESS TIMES AND METHOD OF THE SAME

(75) Inventors: Guo-Zua Wu, Hsinchu (TW); Zu-Wen Chao, Hsinchu (TW); Yi-Jung Wang, Hsinchu (TW); Nai-Heng Tseng, Hsinchu (TW); Shu-Ching Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 827 days.

(21) Appl. No.: 10/806,123

(22) Filed: Mar. 23, 2004

(65) Prior Publication Data

US 2005/0094500 A1    May 5, 2005

(30) Foreign Application Priority Data

Nov. 4, 2003    (TW) ............................. 92130802 A

(51) Int. Cl.
*H04L 9/00* (2006.01)

(52) U.S. Cl. ..................... 726/27; 726/31; 713/193
(58) Field of Classification Search ................... None
See application file for complete search history.

(56) References Cited

U.S. PATENT DOCUMENTS 7,061,850 B1 *   6/2006   Irie et al. ................. 369/59.24
2004/0015711 A1 *   1/2004   Ogura ........................ 713/193

* cited by examiner

*Primary Examiner*—Nasser Moazzami
*Assistant Examiner*—Brandon S Hoffman
(74) *Attorney, Agent, or Firm*—Birch, Stewart, Kolasch & Birch, LLP

(57) ABSTRACT

A method controls the access times of an optical disc end discs of the same. The method includes the following steps. First, an optical disc drive obtains the addresses of a life flag and a medium key block (MKB) by reading a private flag of an optical disc. The life flag and the MKB are used to control the access times of the optical disc. After confirming the addresses of the life flag and the MKB, the optical disc drive obtains an optical power signal to determine the power that should be used to read the MKB. When the optical disc drive uses the appropriate reading power to access the MKB, the recognizable number of access times in the 4KB data is reduced, and the medium key signal is extracted to be confirmed if it is recognizable to restate the main data.

10 Claims, 5 Drawing Sheets

US 7,383,585 B2

OPTICAL DISCS WITH CONTROLLABLE ACCESS TIMES AND METHOD OF THE SAME

This Nonprovisional application claims priority under 35 U.S.C. § 119(a) on Patent Application No(s). 092130802 filed in TAIWAN on Nov. 4, 2003, the entire contents of which are hereby incorporated by reference.

BACKGROUND OF THE INVENTION

1. Field of Invention

The invention relates to an optical disc and its control method for the applications of storing data and controlling its number of access times.

2. Related Art

The well-known read-only optical storage media (or optical discs such as CD and DVD) allow their user to access indefinitely. Therefore, the users only need to purchase or rent only one CD or DVD and share with one another. This makes people less willing to purchase optical discs. Many manufacturers therefore hope to invent a read-only optical disc that can limit or control the total number of play times.

As shown in FIG. 1, the read-only optical discs sold on the market have two areas: one is the title key area 104 and the other is the main data area 105. The main data area is composed of scrambled original data. Both areas are recorded on the surface of the optical disc 100 by embossing. When the optical disc drive 110 accesses the optical disc 100, it first reads the data in the title key area 104 and sends the data to a first descrambler 106 of the optical disc drive 110. Once the data matches the device key 109 of the optical disc drive 110, a key is obtained. The key is then sent to a second descrambler 107 of the optical disc drive 110. At the same time, the optical disc drive 110 sends the main data read from the main data area 105 to the second descrambler 107. The main data are processed by the second descrambler 107 and restored to the original data as music or movie for the user to enjoy.

SUMMARY OF THE INVENTION

It is seen that the conventional optical discs do not have any limit on the number of times for a user to access. The objective of this invention is to provide an optical disc whose number of access times can be controlled. It includes a life flag area, a private flag area, a medium key block (MKB), a title key area, and a main data area.

BRIEF DESCRIPTION OF THE DRAWINGS

The invention will become more fully understood from the detailed description given hereinbelow with illustrations, and thus are not limitative of the present invention, and wherein.

DETAILED DESCRIPTION OF THE INVENTION

Figure 1:
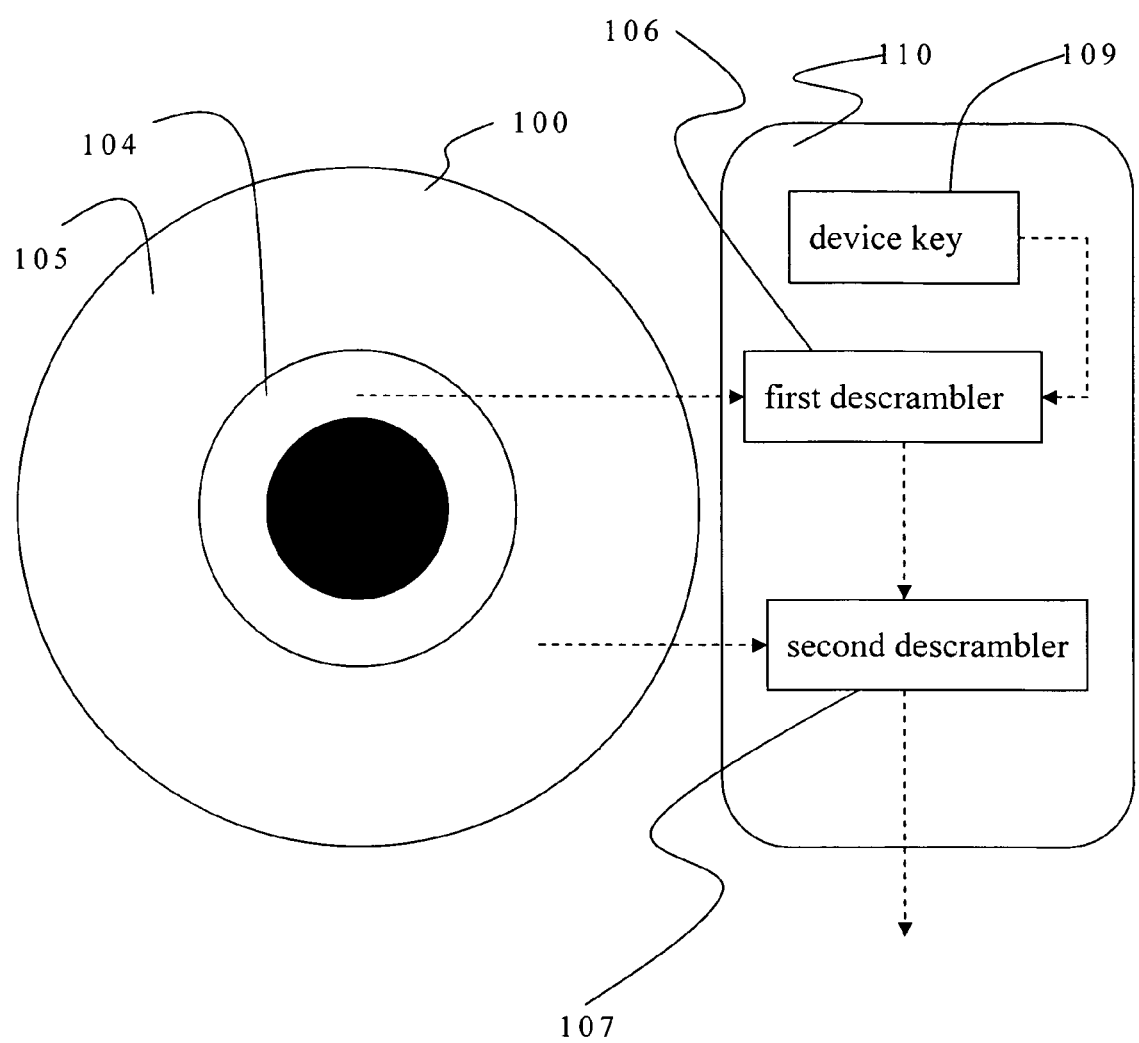
FIG. 1 is a schematic view of an optical disc and an optical disc drive in the prior art.
Figure 2:
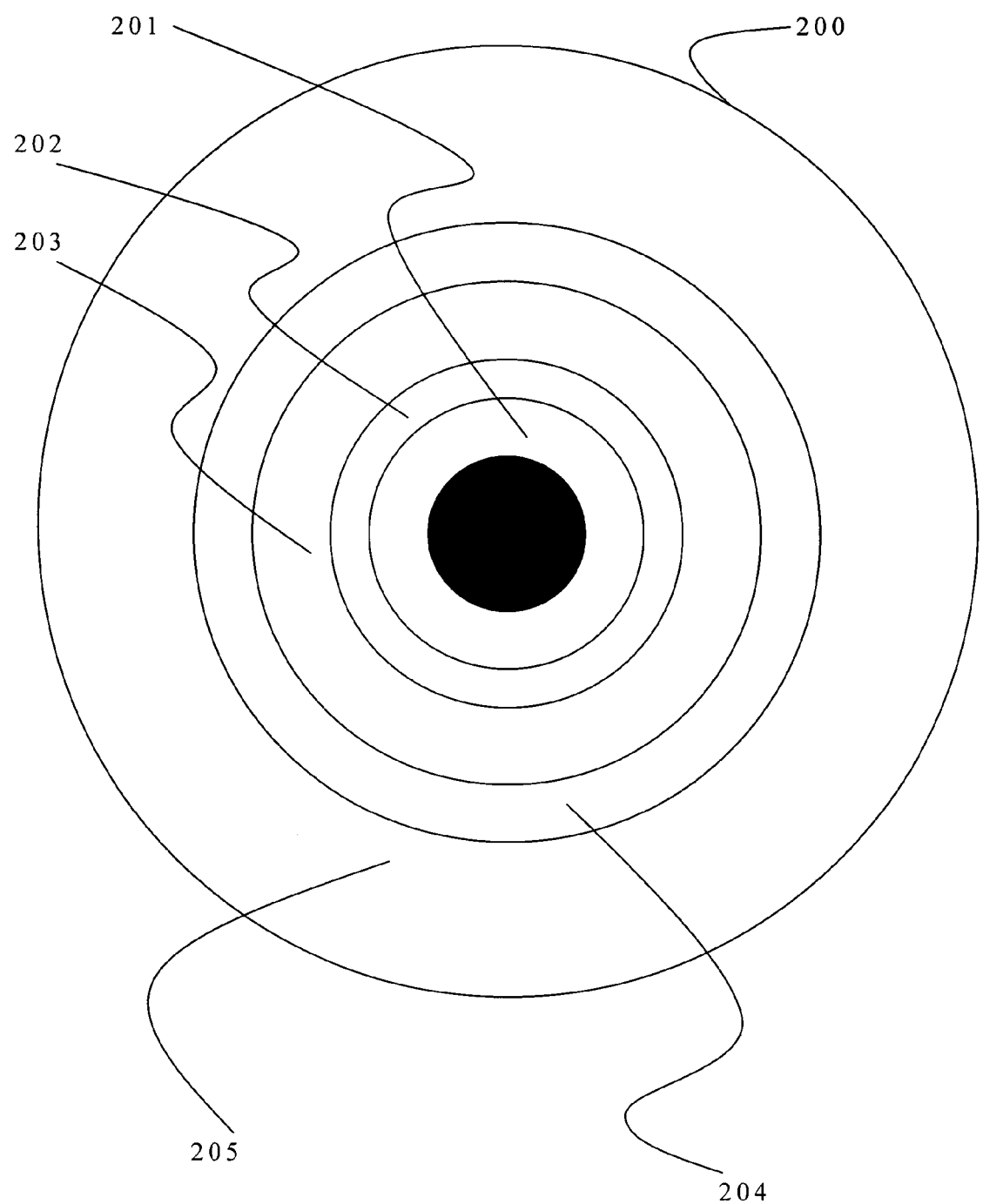
FIG. 2 is a schematic view of the basic structure of the disclosed optical disc.

As shown in FIG. 2, the disclosed optical disc 200 contains a life flag area 201, a private flag area 202, a medium key block (MKB) 203, a title key area 204, and a main data area 205.

The life flag area 201 records an access optical power signal value, which can be 1 or 0, recorded by embossing. When it is 1, the access optical power is 3 mW; when it is 0, the access optical power is 1 mW.

The private flag area 202 records the source type that the optical disc drive reads MKB. The source type can be represented by the value 1 or 0, embossed on the optical disc 200. When the value is 1, it means that the optical disc drive is accessing the MKB 203 of the disc 200; when the value is 0, it means that the optical disc drive receives MKB from other external signal sources.

The MKB 203 records the data of a medium key. If one wants to have a limited number of access times on a disc, the MKB 203 is formed by coating a readable and writeable material on the surface of the optical disc 200. Such a material mainly consists of Te. If one wants the disc to be accessed unlimitedly, the MKB is formed by embossing. Several data areas are randomly written in different positions of the MKB 203. Each data area has the same string. For example, all the data areas have the string 1101. The manufacturer can control the string they prefer. When accessing the optical disc, the string read from different data areas may not be the same. In this case, the optical disc drive considers the string that appears most frequently the MKB signal. The MKB 203 may also be obtained from an external source, but not from the optical disc 200.

The title key area 204 records the data of a title key embossed on the surface of the optical disc 200.

Figure 3:
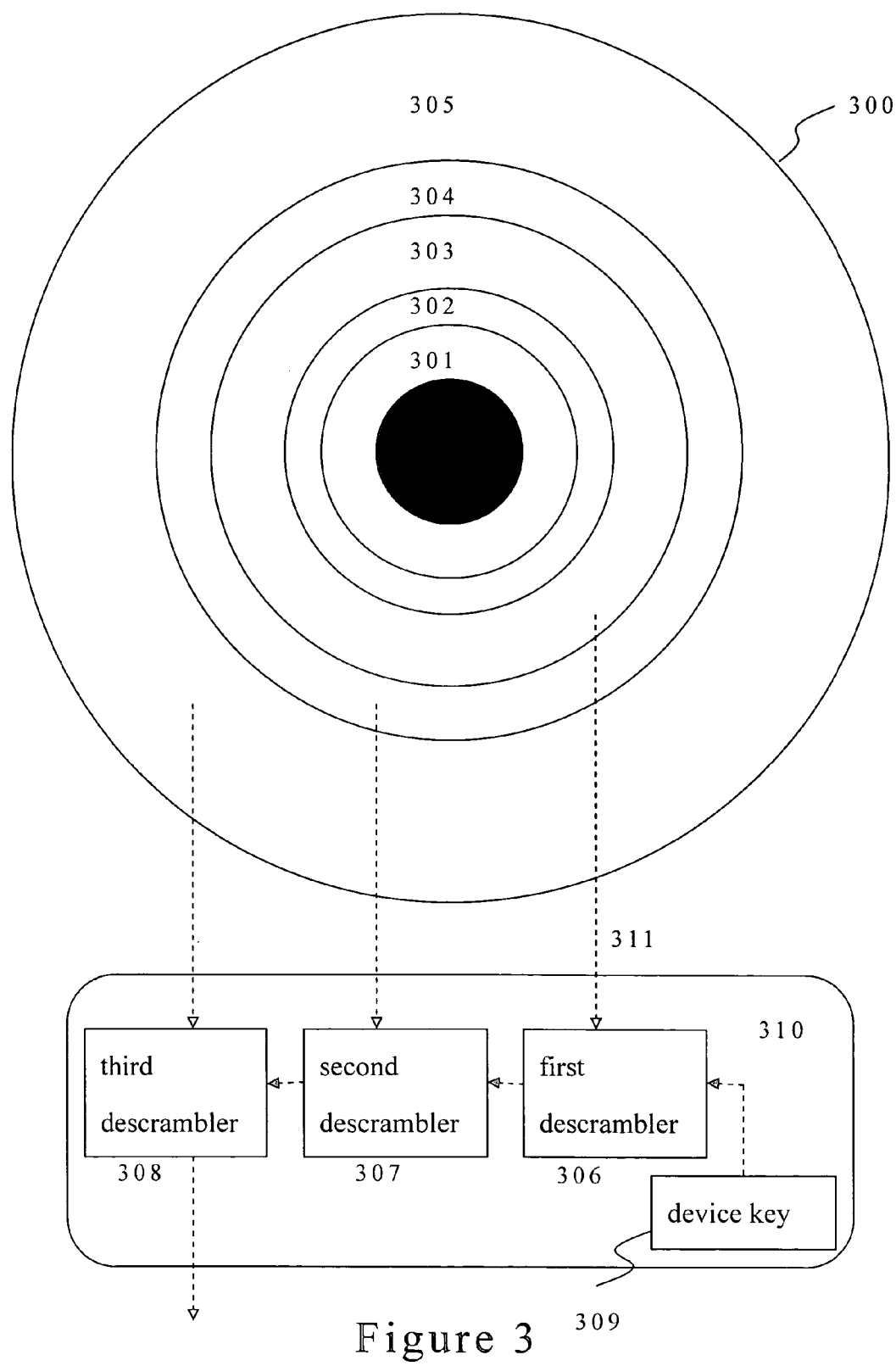
FIG. 3 is a schematic view of an embodiment of the disclosed optical disc and optical disc drive with a controllable number of access times.

The main data area 205 records main data embossed on the surface of the optical disc 200. The main data is formed by scrambling the original data FIG. 3 shows an embodiment of the invention. The optical disc drive 310 controls the number of access times according to the MKB 303 on the optical disc 300. In the beginning, the optical disc drive 310 first reads the access optical power signal value in the life flag area 301, followed by reading the address signal value of the private flag area 302. This confirms the address of the MKB 303 so that the optical disc drive 310 can correctly access the MKB data. The MKB data can be stored on the optical disc 300 or obtained from some external source, depending upon how the manufacturer set the address signal value. In the drawing, the value is 1. Thus, the optical disc drive 310 searches the MKB data on the optical disc 300. The MKB data 311 matches with the device key data 309 of the optical disc drive 310. It is used to generate a title descramble key in a first descrambler 306. The title descramble key along with the title key data read from the title key area 304 of the optical disc 300 is used to generate a main data descramble key in a second descrambler 307. The main data descramble key along with the main data read from the main data area 305 is used to generate the original data in the third descrambler. Finally, the user can play the original data.

Figure 4:
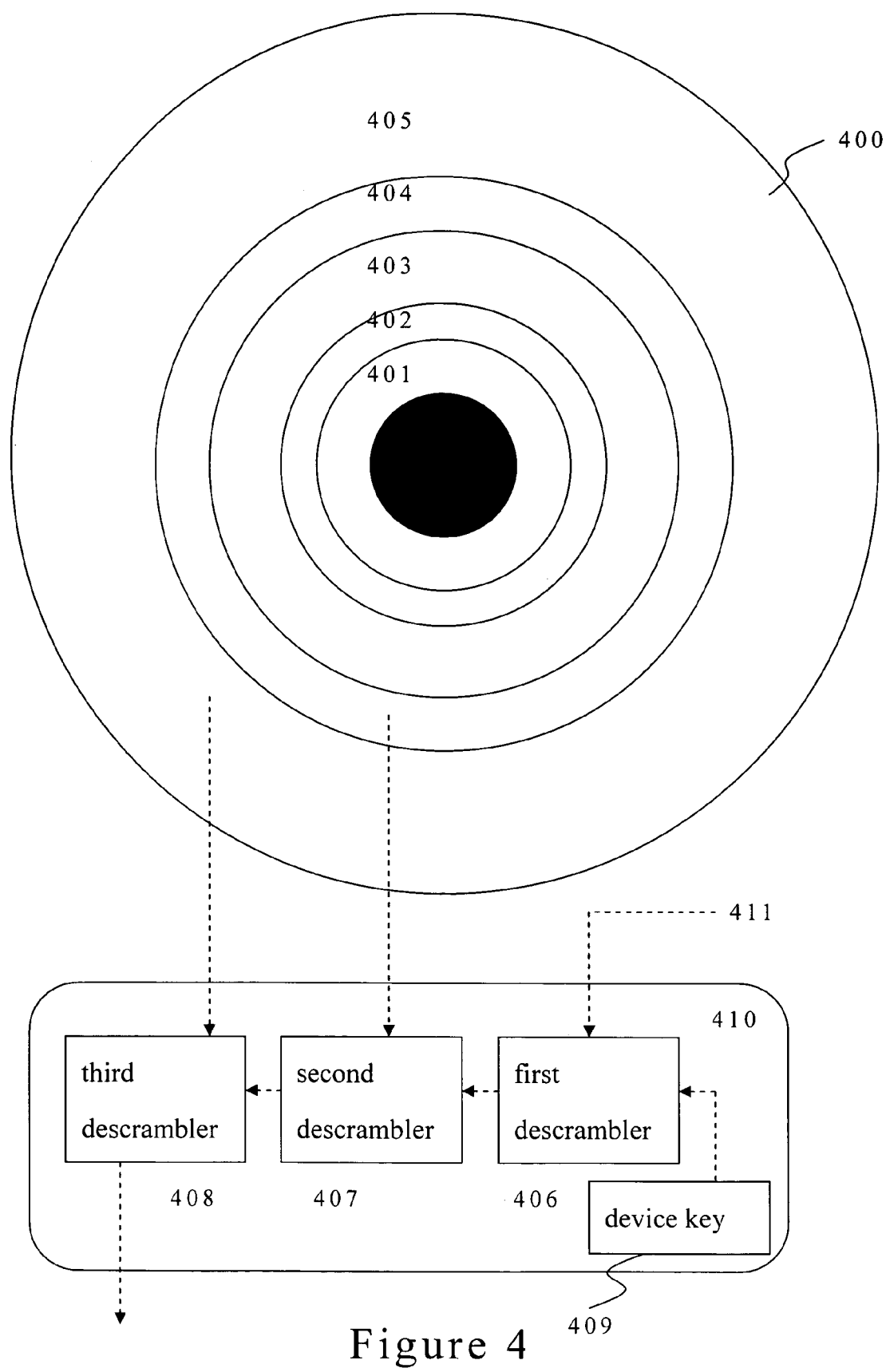
FIG. 4 is a schematic view of another embodiment of the disclosed optical disc and optical disc drive with a controllable number of access times.

In another embodiment of the invention shown in FIG. 4, the optical disc drive 410 reads the MKB data from an externally connected device. In the beginning, the optical disc drive 410 reads the access optical power signal value from the life flag area 401 in order to correctly access the MKB data. The MKB data can be stored on the optical disc 300 or obtained from some external source, depending upon how the manufacturer set the address signal value. In the drawing, the value is 0. Therefore, the optical disc drive does not accept the MKB data on the optical disc 400, but searches other external MKB data. If there is no other MKB data source, the disc cannot be accessed. The external MKB data 411 along with the device key data 409 of the optical disc drive 410 is used to generate a title descramble key in the first descrambler 406. The title descramble key along with the title key data read from the title key area 404 is used to generate a main data descramble key in the second descrambler 407. The main data descramble key along with the main data read from the main data area 405 is used to generate the original data in the third descrambler 408. Finally, the user can make use of the original data.

Figure 5:
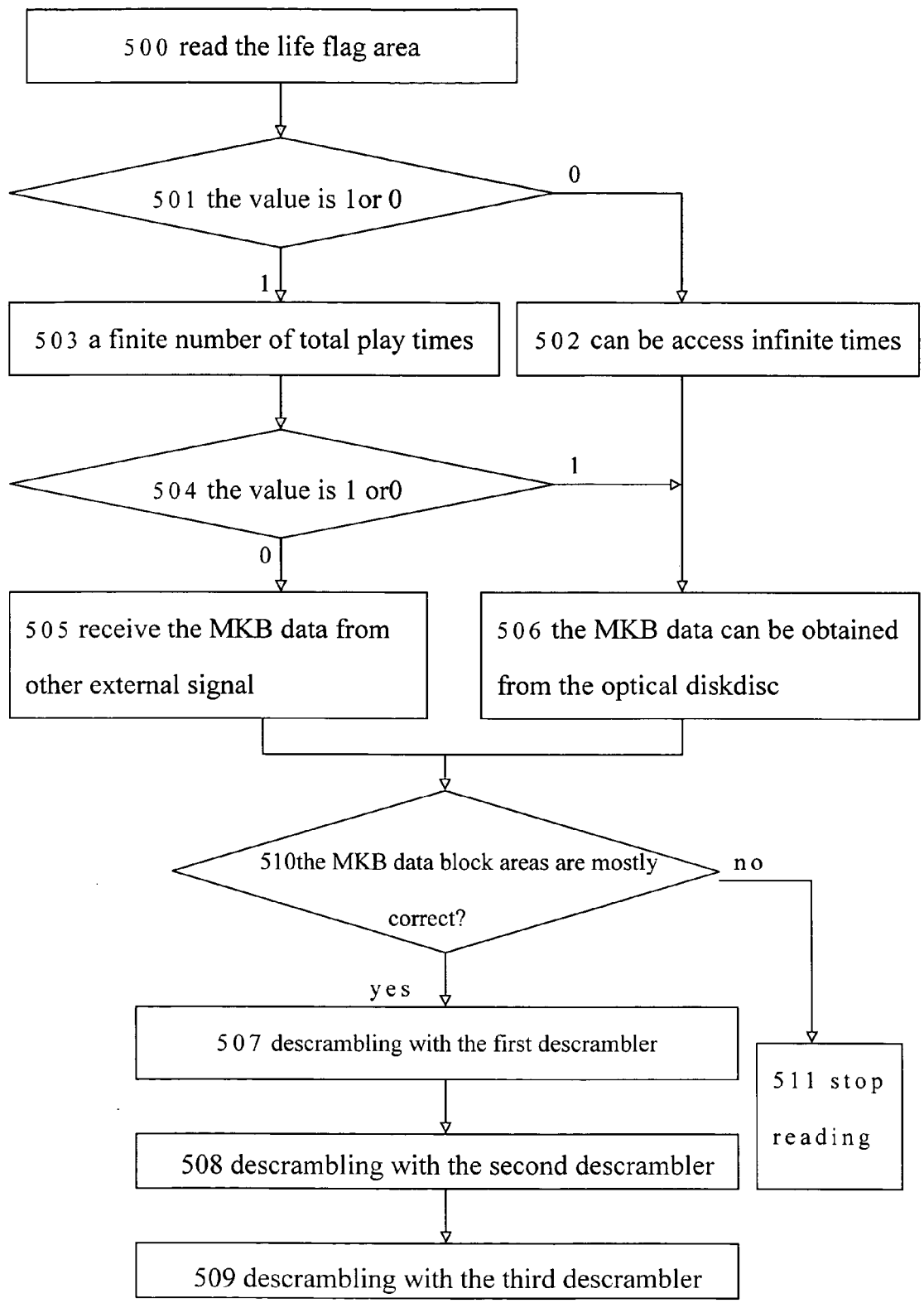
FIG. 5 is a schematic view of the disclosed procedure that controls the number of access times to an optical disc.

As shown in FIG. 5, the disclosed optical disc access method starts by having the optical disc drive read the access optical power signal value in the life flag area (step 500) and determining whether the value is 1 or 0 (step 501). If it is 1, it means that the optical disc has a finite number of total play times (step 503). That is, the MKB is a data area that records the medium key using a readable and writeable material. The material has an appropriate access optical power. If one uses a higher power, such as 3 mW, to access the disc, the material will deteriorate at a faster rate. After a certain number of times, the data cannot be read and recognized because of the material deterioration. Therefore, it achieves the goal of controlling the number of access times. When the access optical power signal value is 0 (step 502), it means that the optical disc can be accessed infinite times. That means that the medium key data are stored by embossing so that the access optical power is low, such as 1 mW. Afterwards, the optical disc drive accesses a private flag area, which records an address signal value that can be 1 or 0 (step 504). The value determines where the optical disc drive can obtain the MKB data 203. When the address signal value is 1, it means that the MKB data can be obtained from the optical disc (step 506); when the value is 0 (step 505), it means that the optical disc drive has to receive the MKB data from some other external signal and ignores the MKB data on the optical disc. The MKB on the optical disc contains several data areas, randomly written at different locations in the MKB 203. The string in each data area is set to be the same. When the optical disc drive accesses the MKB, it reads the string in each data area and put those with the same string to a same group. After counting the frequency of all the strings, the one with the highest appearance frequency is taken as the result obtained by the optical disc drive. This method can minimize the probability that the optical disc drive makes mistakes when reading the MKB. Thus, it will happen that the optical disc cannot be accessed because of the mistakes in reading the data areas in the MKB. The manufacturer can control the material in the MKB to limit the number of access times of any disc (step 510). On the other hand, the composition of the MKB, such as Te, has a preferable access laser wavelength, an optical power that will not deteriorate the material and an optical power that will deteriorate the material. All such information is recorded in the lead-in area of the optical disc. The optical disc drive then uses the information to determine when to use what access optical power. Taking the Te element as an example, the material will deteriorate at a faster rate if it is accessed with an optical power greater than 1 mW. Therefore, the number of times the optical disc drive reads correct data becomes smaller. Once the disc is accessed too many times, the MKB data areas have mostly incorrect data. The optical disc drive cannot go on to the subsequent main data descrambling process (step 511). Therefore, the number of accessible times is finite. On the contrary, if the MKB data areas are mostly correct, the optical disc drive can continue on to the subsequent main data descrambling process and obtain the final data with the help of the first, second, and third descramblers (steps 507, 508, 509). If the manufacturer wants the optical disc to be accessed indefinitely, the MKB is formed by embossing.

Certain variations would be apparent to those skilled in the art, which variations are considered within the spirit and scope of the claimed invention.

We claim:

1. A method of controlling the access times to an optical disc with a private flag area and a main data area that stores scrambled original data, the method comprising the steps of:
   reading the private flag area to obtain an address signal;
   determining a medium key source according to the address signal;
   reading a life flag area to obtain an access optical power signal;
   using the access optical power signal to determine an access optical power for accessing a medium key block (MKB);
   using the access optical power to access the MKB to reduce a recognizable number of access times in the MKB data and obtaining a medium key signal; and
   using the medium key signal to restore the main data on the disc to the original data.

2. The method of claim 1, wherein the step of accessing the MKB reads the medium key signal from the optical disc.

3. The method of claim 1, wherein the step of accessing the MKB reads the medium key signal from some external connected device.

4. The method of claim 1, wherein the MKB contains a plurality of data areas that records a common string.

5. The method of claim 1, wherein the step of determining a medium key signal is performed according to the steps of:
   reading the string in each data area of the MKB;
   classifying those with the same swing to a group;
   computing the appearance frequencies of different strings in the different groups; and
   using the data area string with the highest appearance string as the medium key signal.

6. The method of claim 1, wherein the access optical power for reading the MKB is greater than the access optical power of other areas.

7. The method of claim 1, wherein the step of restoring the main data into the original data includes the steps of:
   combining the medium key signal with a device key of the optical disc drive to generate a title descramble key using a first descrambler;
   combining the title descramble key with a title key data read from a title key area of the optical disc to generate a main data descramble key using a second descrambler; and
   combining the main data descramble key with the main data read from a main data area of the optical disc to obtain the original data using a third descrambler.

8. An optical disc with a controllable access comprising:
   a medium key block (MKB), which is formed on the optical disc using a readable/writeable material for providing a medium key signal;
   a flag area, which is formed on the optical disc to provide an access optical power signal and an address signal, the optical power signal controlling the access optical power for the MKB to be greater than the access optical power for other areas, the address signal determining the source of the MKB;
   a title key area, which provides a title key signal; and
   a main data area, which provides main data that are scrambled original data;

wherein when accessing the MKB, a recognizable number of access times in the MKB date is reduced.

9. The optical disc of claim 8, wherein the MKB contains a plurality of data areas that record a common string.

10. The optical disc of claim 8, wherein the composition of the readable/writeable material includes Te.

* * * * *